Aug. 1, 1939.  F. T. O'GRADY  2,168,042
LENS ASSEMBLY FOR MOTION PICTURE PROJECTION
Filed Oct. 25, 1937   2 Sheets-Sheet 1

INVENTOR
FREDERICK T. O'GRADY
BY
Davis & Davis
ATTORNEYS

Aug. 1, 1939.  F. T. O'GRADY  2,168,042
LENS ASSEMBLY FOR MOTION PICTURE PROJECTION
Filed Oct. 25, 1937   2 Sheets—Sheet 2
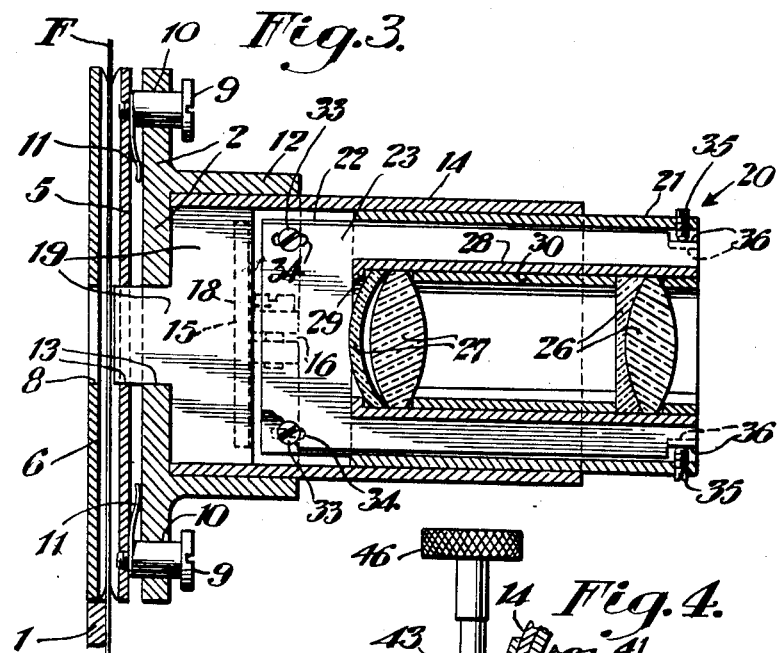
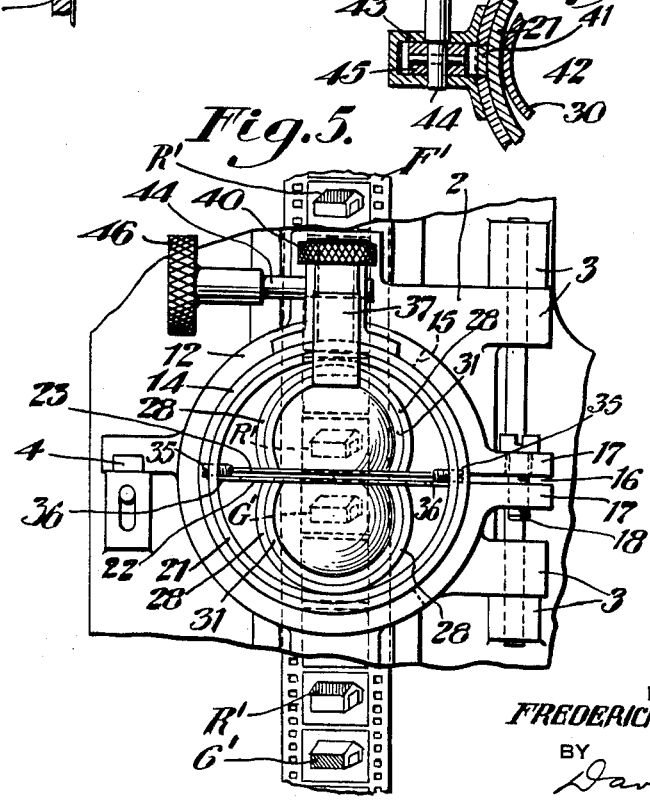
INVENTOR
FREDERICK T. O'GRADY.
BY
Davis & Davis
ATTORNEYS Patented Aug. 1, 1939

2,168,042

UNITED STATES PATENT OFFICE 2,168,042

LENS ASSEMBLY FOR MOTION PICTURE PROJECTION

Frederick T. O'Grady, Flushing, N. Y.

Application October 25, 1937, Serial No. 170,760

11 Claims. (Cl. 88—16.4)

This invention relates more particularly to a lens assembly for color motion picture projection. In certain methods of color projection, such as those disclosed in my U. S. Patent No. 1,579,024 and in my copending U. S. patent application Serial No. 166,951, filed October 2, 1937, companion film pictures having different color records printed thereon are projected simultaneously through separate sets of lenses which are arranged to direct the projected pictures upon a viewing screen and superimpose them in optical register thereon. In their passage to the viewing screen the projected pictures are directed through different color filters appropriate to the color records upon the film pictures so that the single picture upon the viewing screen has the several colors recorded upon the companion film pictures.

Important objects of the present invention are to provide for employment in such methods of projection, a projection lens assembly of improved design; to provide such a lens assembly with a capacity for very accurate operative adjustment; and to embody such a lens assembly in a very simple and compact structure.

Other objects of the invention will appear hereinafter.

In the drawings,

Fig. 3 is a section on the line 3—3 of Fig. 1;

Fig. 4 is a detail section on the line 4—4 of Fig. 2; and

Fig. 5 is a view similar to Fig. 1 showing the lens assembly adapted for projection of companion pictures arranged in longitudinal succession upon the film.

In the method disclosed in my aforesaid copending patent application, Serial No. 166,951 there is employed, for color motion picture projection, a film having companion pictures in reduced scale arranged side by side on the film at opposite sides of a longitudinal center line. The companion pictures together occupy a standard size picture area and their images correspond in shape and size. They are also arranged on end or swung around ninety degrees from normal, upright position. The pictures bear records of different colors or color values. One say, bears a record of the color red and the other of the color green. They are projected simultaneously and superimposed in optical register upon a viewing screen. In its passage to the viewing screen the projection from the film picture with a record of red is directed through a red color filter and the projection from the film picture with a record of green is projected through a green color filter. By the employment of mirrors the projected pictures are also swung around ninety degrees to dispose them upright upon the viewing screen. Upon the screen there is obtained a single, upright picture bearing both of the said colors.

Figure 1:
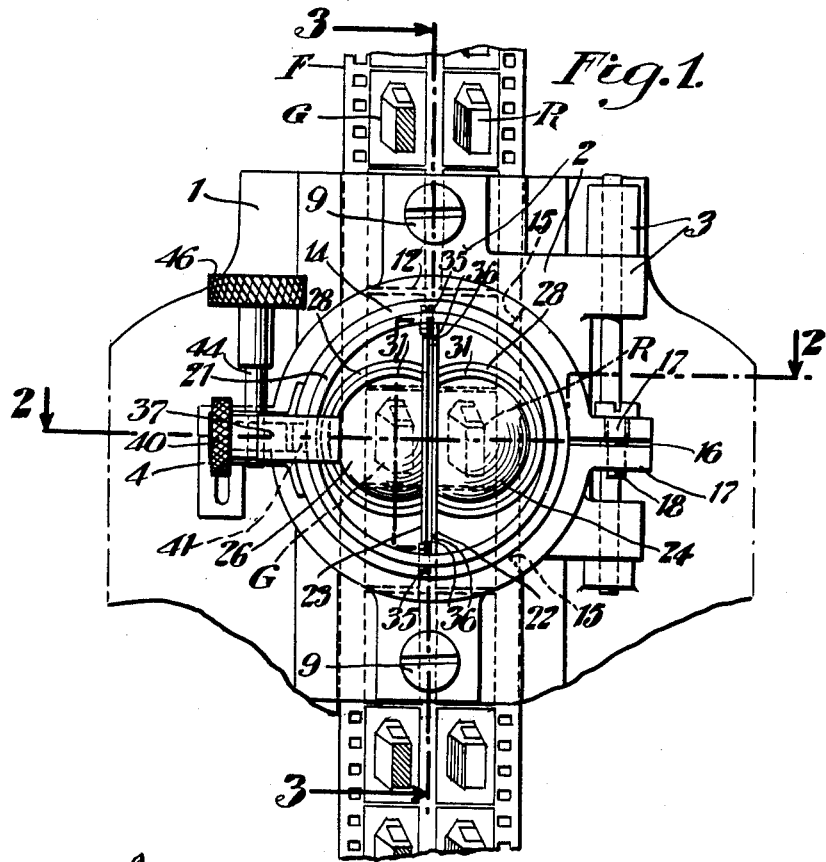
Fig. 1 is a front view of the improved lens assembly and its mounting upon a projection machine, the assembly being adapted for projection of companion pictures arranged side by side upon the film.
Figure 2:
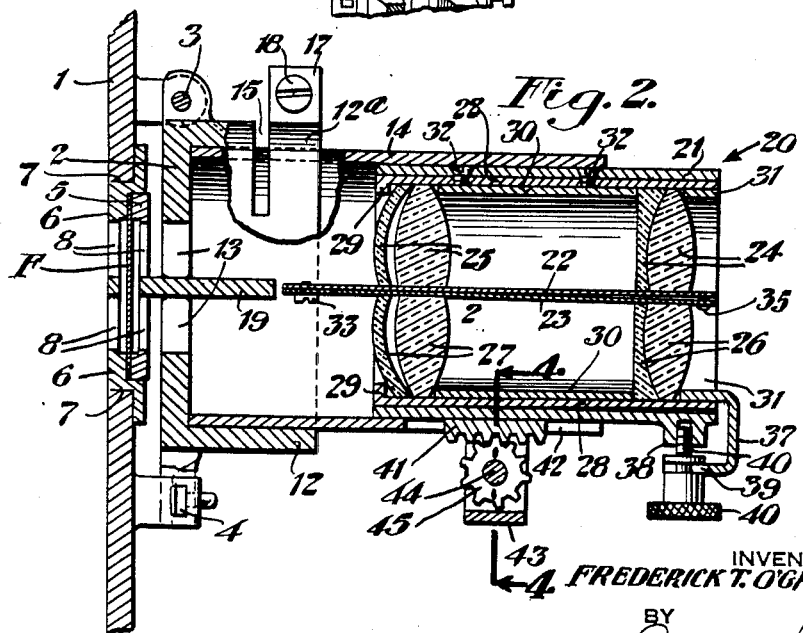
Fig. 2 is a section approximately on the line 2—2 of Fig. 1.

As illustrated in Figs. 1, 2 and 3 the improved lens assembly is adapted for the projection of the side by side companion pictures of the film just described.

In the drawings 1 designates a front wall of a projection machine. A film gate plate 2 is hinged to said wall, as at 3, to swing to open and closed positions about a vertical axis. A latch 4 is provided to hold the gate plate in closed position. At its rear side the gate plate bears a film presser plate or pad 5 in a vertical plane. Opposed to the rear face of said presser plate there is a fixed aperture plate 6 mounted within a vertical slot 7 in the wall 1. Said plates are formed to engage the opposite side margins of the film F to flatten the latter therebetween. The film is intermittently advanced vertically downward between the plates by mechanism, not shown. Between their film-engaging portions the plates have side-by-side exposure apertures 8 shaped and arranged to expose and frame a pair of the companion pictures G and R upon the film. These pictures occupy a single standard size picture area upon the film and their images are on end. The picture G bears a record of the color green and the picture R bears a record of the color red.

The presser plate or pad 5 is borne by the film gate plate and is yieldably pressed against the film. For supporting the plate 5 there are two screws 9 screwed into threaded apertures located near the upper and lower ends of plate 5. These screws have enlarged cylindrical shank portions slidably fitted in bores 10 formed in the gate plate 2. Clamped between the rear ends of the enlarged shank portions of the screws and the plate 5 there are leaf springs 11 whose free ends bear against the rear face of the gate plate. These springs urge the plate 5 rearwardly against the film. Said plate swings to open position along with the gate plate, and the screws have heads to limit the shift of the plate away from the gate when the latter is swung open.

At its front face the gate plate is formed with a forwardly projecting tubular or annular extension 12 and at the center of the face area surrounded by said extension the gate plate has a pair of side-by-side exposure apertures 13 similar to the apertures 8 and in register with them. A tubular member 14 has its rear end portion rotatively and removably fitted within the annular extension 12. For clamping the tubular member 14 in a rotatively adjusted position provision is made for contracting a portion of the extension 12 about said member. To this end the extension 12 is provided with a slot 15 extending materially around its circumference. The portion 12ª of the extension, located forward of said slot, has a radial slot 16 and outwardly extending ears 17. A headed clamping screw 18 is passed through an aperture in one of said ears and screwed into a threaded aperture in the other ear. By tightening the screw 18 the forward portion of the annular extension is contracted into binding engagement with the tubular member 14.

Fixed within the rear end portion of the tubular member 14 there is an opaque dividing plate 19 diametrically arranged. This plate has a reduced rearward extension separating the exposure apertures 8 in the presser plate 5 and the exposure apertures 13 in the gate plate 2. Said dividing plate serves to separate the projected pictures and prevent the occurrence of secondary images upon the viewing screen. Forward of said dividing plate a lens unit 20 is fitted into the tubular member 14 for longitudinal focusing adjustment. As will be described hereinafter, the lens unit is keyed for rotative adjustment with the tubular member 14.

The lens unit includes a tubular casing 21. A thin flat sheet metal dividing plate 22 extends substantially diametrically within the casing 21. A similar plate 23 is arranged in opposed face to face relation to plate 22. These opposed plates are in the fore and aft vertical plane of the rear dividing plate 19, and their rear edges are in juxtaposition to the forward edge of plate 19. Attached to plate 22 there is a projection lens set including spaced fore and aft lenses 24 and 25 respectively. A similar set of projection lenses 26 and 27 are attached to the plate 22. The lenses of said sets have their edges ground off at one side to provide a flat surface bearing against the attached plate and to bring the optical axes of the sets closer together. A mutilated tubular member or lens barrel 28 confines each lens set around the arcuate edges of the lenses and is secured at its longitudinal edges to the plate bearing the set. Said plate and the barrel together surround the set. Each lens barrel has an inturned flange 29 at its rear edge abutting the rearmost lens of the set. Within said barrel there is an arcuate spacer member 30 separating the fore-and-aft lenses, and fitted within the forward end of the barrel and secured thereto there is an arcuate strip or ring 31 abutting the foremost lens of the set. Thereby the lenses of each set are held in properly spaced relation.

One of the said lens sets and its associated parts 22, 28, 30 and 31 are held in a fixed position within the tubular casing 21 by screws 32. The other lens set and its similar associated parts are tiltably adjustable with reference to the said first set and are also adjustable both longitudinally and transversely relatively to the first set. The plates 22 and 23 bearing the two lens sets extend rearwardly from the latter, and near their rear edges the plates are secured together by two headed screws 33. Each screw passes through a longitudinal slot 34 in plate 23 and is screwed into a threaded aperture in the fixed plate 22. The plate 23 is flexible about its point of attachment to plate 22 so that by flexure of plate 23 the lens set borne thereby may be tiltably adjusted relatively to the fixed lens set to converge the optical axes of the sets. Thereby the companion projected pictures may be superimposed in optical register upon the viewing screen.

In order to longitudinally adjust the lens set borne by the plate 23 relatively to the lens set borne by the fixed plate 22 the screws 33 are loosened and then, owing to the slots 34, the plate 23 and attached lens set may be adjusted fore-and-aft. For transverse adjustment of the lens set borne by the plate 23 the forward end of the tubular casing 21 bears two diametrically arranged adjusting screws 35. The forward corners of plates 22 and 23 are cut away, as at 36, the fixed plate 22 being cut away a little more deeply than the adjustable plate 23. The adjusting screws are screwed through threaded apertures in the casing 21 and their inner ends are disposed to engage the adjacent edges of plate 23. At their outer ends the screws are slotted to receive a screw driver. After loosening the attaching screws 33 the plate 23 may be swung slightly edgewise by turning the adjusting screws 35. The slots 34 afford sufficient clearance for such transverse adjustment.

Provision is made for the aforesaid tiltable adjustment of the lens set attached to plate 23 from the exterior of the lens unit. The lens retaining ring 31 of the adjustable lens set has an extension 37 bent outward and rearward to overlie a boss 38 upon the exterior of casing 21. At its outer extremity said extension has a slot or notch 39 in register with a screw-threaded aperture in said boss. An adjusting screw 40 has a threaded shank passed through said slot and screwed into said aperture. Said screw has abutments engaging the opposite faces of said slotted extension so that by turning the screw the said extension is moved inward or outward and the adjustable lens set is tiltably adjusted relatively to the fixed lens set. Preferably the screw has a knurled head, as shown. Such tiltable adjustment will be made in accordance with the distance of the viewing screen from the projection machine, so that the separate pictures projected through the lens sets will register accurately upon the viewing screen. The lens sets are removable through the forward end of the tubular casing or barrel 21, after removal of the screws 32, and the slotted connection of the extension 37 with the adjusting screw 40 enables disconnection of said extension from the screw, for such removal of the lens sets.

Provision is made for convenient focusing adjustment of the lens unit from the exterior. A gear rack 41 is secured to the exterior of casing 21 and extends longitudinally thereof. To accommodate the rack the tubular member 14 has a longitudinal slot 42 through which the rack protrudes and in which it has a close, sliding fit. A U-shaped bracket 43 is fixed to the exterior of said tubular member 14 and straddles the rack. A shaft 44 extends across said bracket and is journalled in the opposite sides thereof. Within the bracket a pinion 45 is fixed to the shaft and meshes with the rack. The shaft has a knurled head 46 and by turning it the lens unit 20 may be adjusted longitudinally within the tubular member 14. It will be observed also that the engagement of the rack in the slot 42 keys the lens unit to the tubular member 14 so that the lens unit may be rotatively adjusted by releasing the clamping screw 18, then rotating the tubular member 14 and the lens unit together, and tightening the screw 18 to maintain the adjustment.

It will be seen that the structure disclosed contains provision for quite a variety of accurate adjustments in order to bring the lens sets in proper correlation to each other and in proper correlation to the film pictures and the viewing screen. It will be seen also that the structure is very compact, simple and comparatively inexpensive.

In Fig. 5 there is shown an adaptation of the lens assembly for simultaneous projection of companion pictures arranged in succession along the film. The film F' has pictures R' with red color records alternating along the film with companion pictures G' having green color records. Each picture occupies a full standard size picture area on the film. For simultaneous projection of two of such companion pictures the lens unit is arranged so that the dividing plates are disposed in planes crosswise of the film and the lens sets are arranged one above the other.

While I have disclosed a very desirable form of projection lens assembly same is susceptible of modification in its detail construction and in its mode of employment without departing from the spirit of the invention. Therefore I do not wish to be limited strictly to this disclosure but reserve the right to make such changes and adaptations as will lie within the scope of the appended claims.

What I claim is:

1. An optical unit for a motion picture apparatus, comprising a plurality of lens means arranged with their optical axes in transversely spaced relation, a plurality of dividing plates between said lens means and opposed face to face and one attached to one of the lens means and the other to the other lens means, one of said plates being adjustable edgewise relatively to the other plate for relative adjustment of the lens means, releasable fastening means clamping together said plates at their rear margins rearward of the two lens means to retain said relative adjustment, one of said plates being flexible forward of said clamped margins, and manually operable adjusting means for flexing said plate to tiltably adjust the optical axis of its attached lens means with reference to the optical axis of the other lens means.

2. An optical unit according to claim 1, characterized in that the said edgewisely adjustable plate is adjustable edgewise both longitudinally and transversely of the optical axes relatively to the companion plate, and the said fastening means is adapted to retain the plate in both of said adjustments.

3. An optical unit according to claim 1, characterized in that the said fastening means for the dividing plates comprises headed screw means borne by one of the plates and the other plate is slotted for reception of said screw means and to permit said edgewise adjustment.

4. An optical unit according to claim 1, characterized in that there are adjusting screws mounted forward of the said fastening means and arranged to engage the opposite side edges of the edgewisely adjustable plate to adjust the latter and its attached lens means transversely of the optical axes.

5. An optical unit for a motion picture apparatus, comprising a barrel, a plurality of lens means arranged in said barrel with their optical axes in transversely spaced relation, a pair of dividing plates between said lens means and opposed face to face and one attached to one of the lens means and the other to the other lens means, one of said plates and its attached lens means being held against movement in any direction within the barrel and the other plate being adjustable edgewise for adjustment of its attached lens means, means to releasably clamp together the rear margins of said plates to retain said adjustment, said adjustable plate being flexible forward of its clamped margin, and adjusting means borne by the barrel and manually operable to flex the adjustable plate for tiltably adjusting the optical axis of the attached lens means with reference to the axis of the other lens means.

6. An optical unit according to claim 5, characterized in that the adjustable plate is adjustable edgewise both longitudinally and transversely of the optical axes, there are adjusting screws borne by the barrel to engage the opposite side edges of said plate for adjusting it transversely, and there is another adjusting screw borne by the barrel and operatively connected to said plate for effecting the said tilting adjustment.

7. An optical unit for a motion picture apparatus, comprising a barrel, a plurality of lens means mounted in said barrel and arranged with their optical axes in transversely spaced relation, a pair of dividing plates between said lens means and opposed face to face and one attached to one of the lens means and the other to the other lens means, one of said plates being adjustable edgewise relatively to the other plate for relative adjustment of the lens means, releasable fastening means clamping together said plates at their rear margins rearward of the two lens means to retain said relative adjustment, one of said plates being flexible forward of said clamped margins, an outside adjusting screw borne by said barrel and extending outward transversely from the forward end portion of the barrel, and means operatively connecting said screw to said adjustable plate and including a U-shaped connection straddling the forward edge of the barrel and having a leg thereof extending rearwardly from said edge and operatively connected to said screw outside of the barrel, for flexing the adjustable plate to tiltably adjust the lens means attached thereto relatively to the other lens means by turning said screw.

8. An optical unit for a motion picture apparatus, comprising a barrel, a plurality of lens means mounted in said barrel and arranged with their optical axes in transversely spaced relation, a pair of dividing plates between said lens means and opposed face to face and one attached to one lens means and the other to the other lens means, one of said plates being adjustable edgewise relatively to the other plate for relative adjustment of the lens means, releasable fastening means clamping together said plates at their rear margins rearward of said lens means to retain said relative adjustment, one of said plates being flexible forward of said clamped margins, and adjusting means for flexing said plate to tiltably adjust the optical axis of its attached lens means with reference to the optical axis of the other lens means; and a mounting for said unit supporting it for rotative adjustment about the axis of the barrel and including releasable means for locking the unit in such rotative adjustment.

9. An optical unit for a motion picture apparatus, comprising a plurality of lens means arranged with their optical axes in transversely spaced relation, a plurality of dividing plates between said lens means and opposed face to face and one attached to one lens means and the other to the other lens means, one of said plates being adjustable edgewise relatively to the other plate for relative adjustment of the lens means, releasable fastening means clamping together said plates at margins thereof spaced along the optical axes from the lens means to retain said relative adjustment, one of said plates being flexible between said margins and the lens means attached to said plate, and adjusting means for flexing said flexible plate to tiltably adjust the optical axis of its attached lens means with reference to the optical axis of the other lens means.

10. An optical unit for a motion picture apparatus, comprising a barrel, a plurality of lens means mounted in said barrel with their optical axes in transversely spaced relation, means supporting one of said lens means for tilting adjustment of its optical axis with reference to the optical axis of the other lens means and for removal through the forward end of the barrel, an outside adjusting screw borne by said barrel and extending outward transversely from the forward end portion of the barrel, and means operatively connecting said screw to said adjustable lens means and including a U-shaped connection straddling the forward edge of the barrel and having a leg thereof extending rearward from said edge and formed with a rearwardly opening notch at its rear end, said screw having a peripheral groove and the notched end of said leg portion fitting in said groove to operatively connect the screw to said adjustable lens means, for tilting of the optical axis of the latter by turning the screw, said notch permitting detachment of said U-shaped connection from the screw for forward removal of said connection along with the adjustable lens means.

11. An optical unit for a motion picture apparatus, comprising a barrel, a plurality of lens means mounted in said barrel with their optical axes in transversely spaced relation, means supporting one of said lens means for tilting adjustment of its optical axis with reference to the optical axis of the other lens means, an outside adjusting screw borne by said barrel and extending outward transversely from the forward end portion of the barrel, and means operatively connecting said screw to said adjustable lens means and including a U-shaped connection straddling the forward edge of the barrel and having a leg thereof extending rearwardly from said edge and operatively connected to said screw, for said adjustment of said adjustable lens means by turning the screw.

FREDERICK T. O'GRADY.